March 17, 1925.

A. C. O. BOCK

1,529,864

AUTOMATIC FINGERPRINT MACHINE

Filed Aug. 19, 1922

A. C. O. BOCK

1,529,864

AUTOMATIC FINGERPRINT MACHINE

Filed Aug. 19, 1922    9 Sheets-Sheet 5

March 17, 1925.  1,529,864
A. C. O. BOCK
AUTOMATIC FINGERPRINT MACHINE
Filed Aug. 19, 1922   9 Sheets-Sheet 8

Patented Mar. 17, 1925.

1,529,864

UNITED STATES PATENT OFFICE.

ALFRED CHARLES OTTO BOCK, OF BROOKLYN, NEW YORK, ASSIGNOR TO FINGERPRINT MACHINE CORPORATION, A CORPORATION OF NEW YORK.

AUTOMATIC FINGERPRINT MACHINE.

Application filed August 19, 1922. Serial No. 582,961.

*To all whom it may concern:*

Be it known that I, ALFRED CHARLES OTTO BOCK, a citizen of the United States of America, residing at Brooklyn, county of Kings, and State of New York, have invented new and useful Improvements in Automatic Fingerprint Machines, of which the following is a specification.

This invention relates to machines whereby the print of a person's finger may be readily and accurately obtained.

The object of the present invention is to provide improvements upon the machine as set forth in applications for patent by Charles F. Glass, Serial Number 418,857 filed October 23, 1920, and another Glass application Serial Number 320,593 filed August 29, 1919.

The main object of the invention is to provide an automatically operating machine of the character indicated.

A further object is to provide timing mechanism whereby the heating of the impressed surface may be determined and regulated.

A further object is to provide means for automatically returning the operating handle to normal position after it has been moved to its limit, thus eliminating the care and skill previously required in machines of this character.

Other and ancillary objects will appear hereinafter.

In the accompanying drawings which illustrate the invention.

Referring to the drawings, a casing provided with a base 11 and sides 12 houses the mechanism. The top 13, being secured to the sides by screws 14, is provided with a glass insert 15. Openings 16 are provided for the purpose of allowing heat generated within the casing to escape therefrom. Rubber knobs 17 may be used if desired to prevent the casing from marring the surface on which it is placed.

A drawer 18 is used to catch the unused pigment and is slidingly disposed in the base of the casing. A handle 19 permits the ready withdrawal from the casing.

A housing 20 attached to the rear of the casing 12 encloses the gears preventing dust or other foreign matter from obstructing the operation of the gears.

The operating handle 21 is capable of movement in a guide way being arcuately shaped. Plate 23 is removably secured to the side of the casing 12 by screws or the like 24 permitting thereby ready access to a portion of the mechanism.

The opposite side of the casing is provided with a hinged door 25 hinged at 26 to the side and permitting access to a portion of the interior of the machine.

Figure 1:
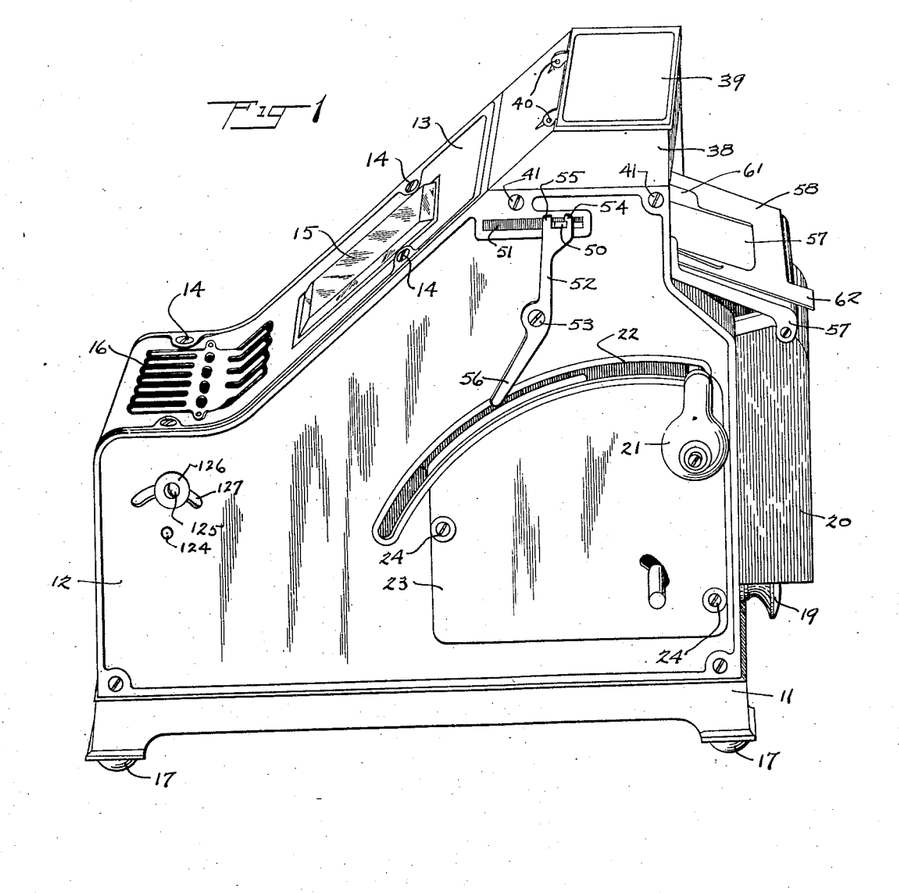
Figure 1 is a perspective view of a machine embodying the invention.
Figure 2:
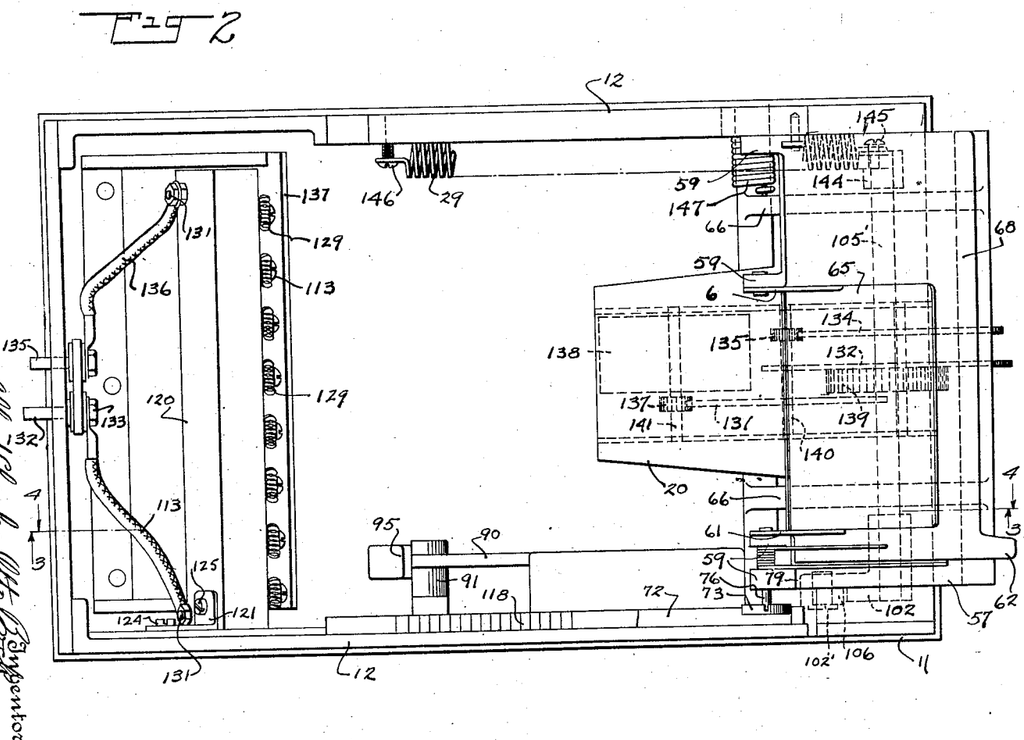
Fig. 2 is a top plan view with a part of the casing removed.
Figure 3:
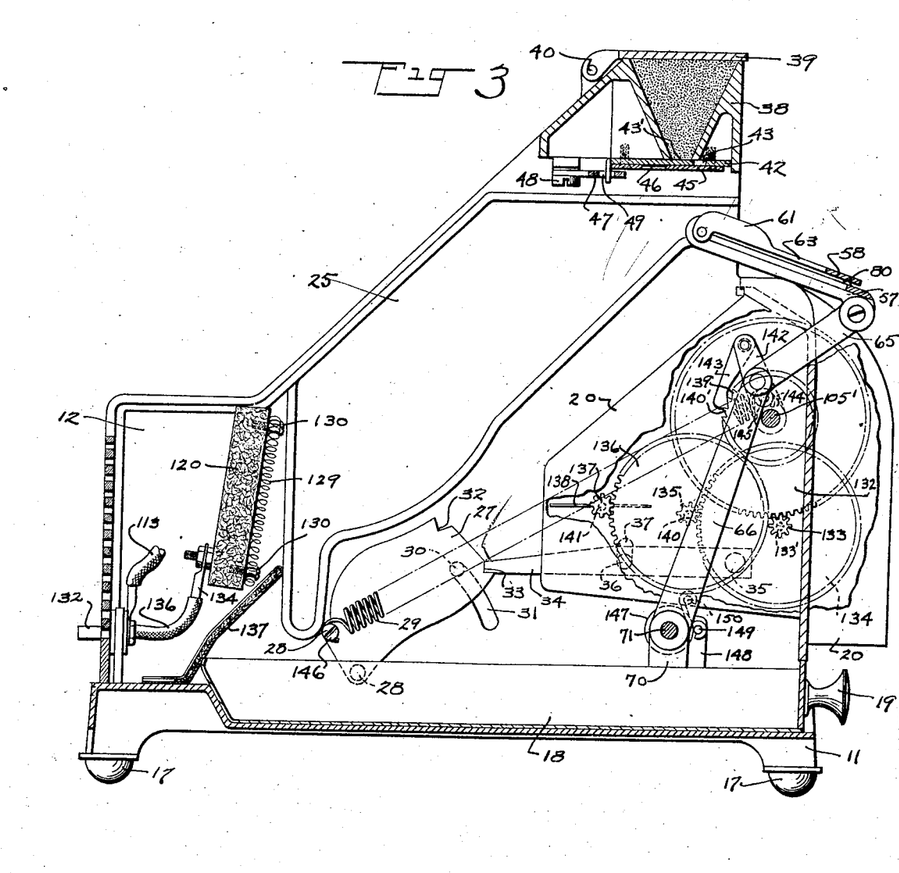
Fig. 3 is a section on the line 3—3 of Fig. 2, part of the mechanism being removed showing more particularly the gear arrangement.
Figure 4:
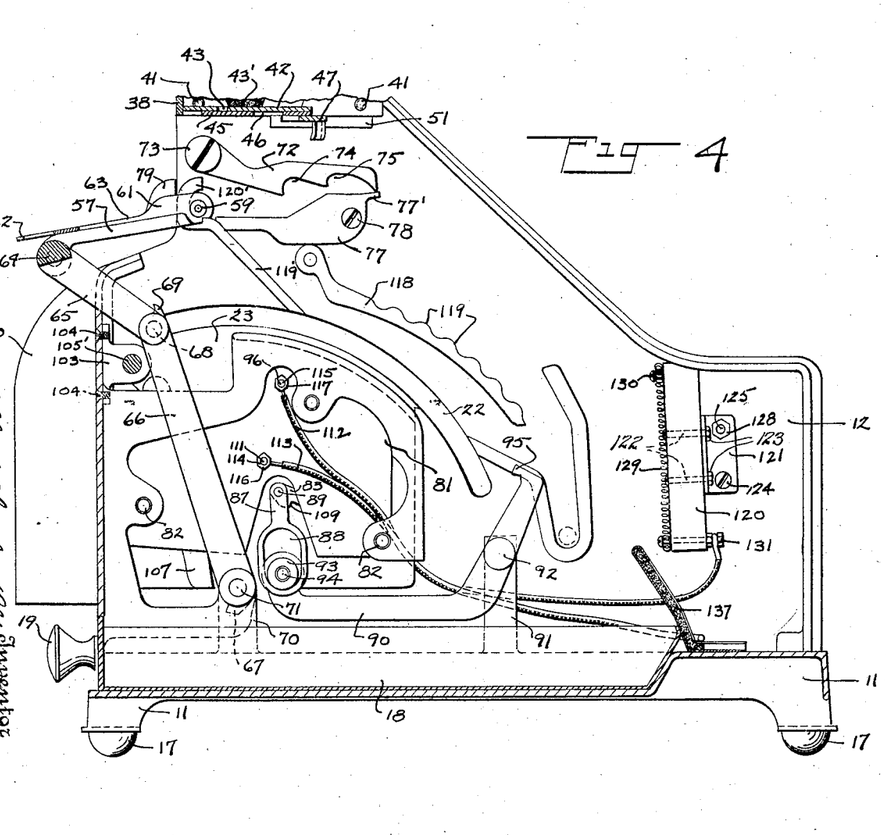
Fig. 4 is a sectional view of the machine on the line 4—4 of Fig. 2 showing the arrangement of the parts in normal position.

A plate member 27 hinged to the interior of the side at 28 provides a means for varying the tension of the spring 29 as will be described later. This member is provided with an outwardly extending knob 30 which moves in a guide way 31 formed in the side of the casing. Notches 32 and 33 are provided in the member 27 for selective engagement of the pawl 34. The pawl consists of a lever pivoted at 35 and provided with an outwardly extending knob 36 midway of the lever and operated in a slot 37 formed in the side of the casing. It will thus be observed by lifting the knob 36, consequently lifting the lever 34 out from the notch 32 or 33 the member 27 may be turned about its pivotal point 28 thereby varying the strength of the coil spring 29 which is attached thereto by a screw 146 shown in Figure 2.

Figures 14, 15:
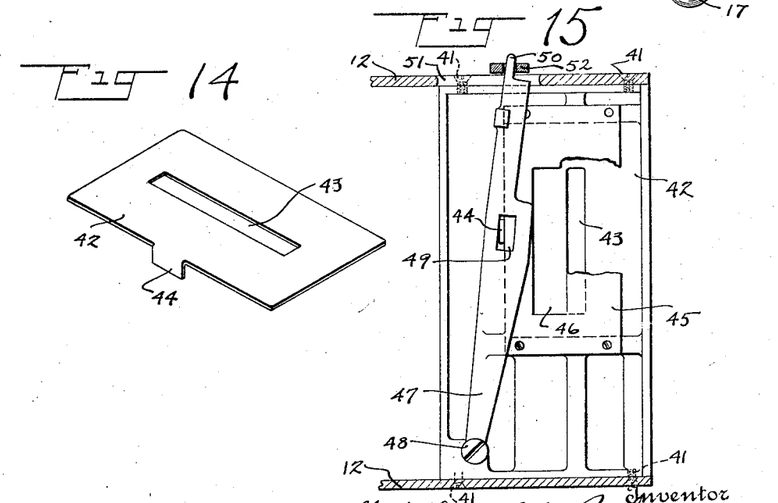
Fig. 14 is a perspective view of the slide member for the hopper for feeding pigment therefrom.
Fig. 15 is a bottom plan view of the hopper.

Secured to the top of the casing is a hopper 38 provided with a cover 39 pivoted at 40 and adapted to contain a powdered pigment. This hopper extends horizontally across the top of the casing and is secured to the sides by means of screws 41 or the like. The means for discharging pigment from the hopper consists of a slide member 42 shown more particularly in Figure 14. The slide member is provided with an elongated slot 43 extending longitudinally thereof which is adapted to register with the outlet 43' of the hopper. A lug 44 downwardly extending is formed integrally with the slide member 42. A plate 45 serves as a guide for the member 42, and is also provided with an opening 46. A lever 47 is pivoted at 48 on the under side of the hopper 38 and extends transversely thereof. Approximately midway of its length an opening 49 is formed through which the lug 44 of the slide member 42 is adapted to extend. A finger 50 on the lever 47 moves in a slot 51 formed in the side of the casing.

A lever 52 pivoted at 53 to the outside of the casing is adapted to move the finger 50, being provided with fingers 54 and 55 between which the finger 50 is disposed. The lower end 56 of the lever 52 is so arranged to be in the path of travel of the operating handle 21, so that when the lever 21 comes in contact with the lever 52, the same will be rotated in a clockwise direction, thereby moving the finger 50 back to normal position.

A retaining member is provided to hold the impression surface 80 comprising a base 57 and a spring-pressed retainer 58 pivoted at 59 and 60 to the base being yieldingly held thereagainst by the spring members 61. The retainer 58 is provided with a finger 62 and a square opening 63. The impression surface which may be paper or other suitable material is placed between the retainer 58 and the base 57, showing through the opening 63.

Pivoted to the base 57 of the retaining member at 64 is the angular extension 65 of the lever 66. The lever 66 is provided with a lug 67 at one end thereof and a lug 69 at the other end. The operating handle 21 is secured to the lever 66 being rotatably mounted on the rod 68. The lever 66 is also pivoted to a support 70 at 71.

Pivoted to the upper portion of the casing is a lever 72 pivoted at 73 and provided with recesses 74 and 75. By the movement of the operating handle 21, the rod 76 which is attached to the base of the impression surface retaining member, will strike against the recesses 74 and 75 and be thus prevented from being returned to normal position. A second lever 77 pivoted at 78 provides a rest for the end of lever 72 on lug 77' and creates therebetween a guide for the rod 76. During such movement of the rod 76, the lug 79, which is attached to the base 57 of the retaining member, will come in contact with the downward extending lug 44 of the sliding member 42 thereupon moving the same. In this manner pigment is discharged from the hopper 38 and to the impression surface 80.

Figures 9, 10, 11, 12:
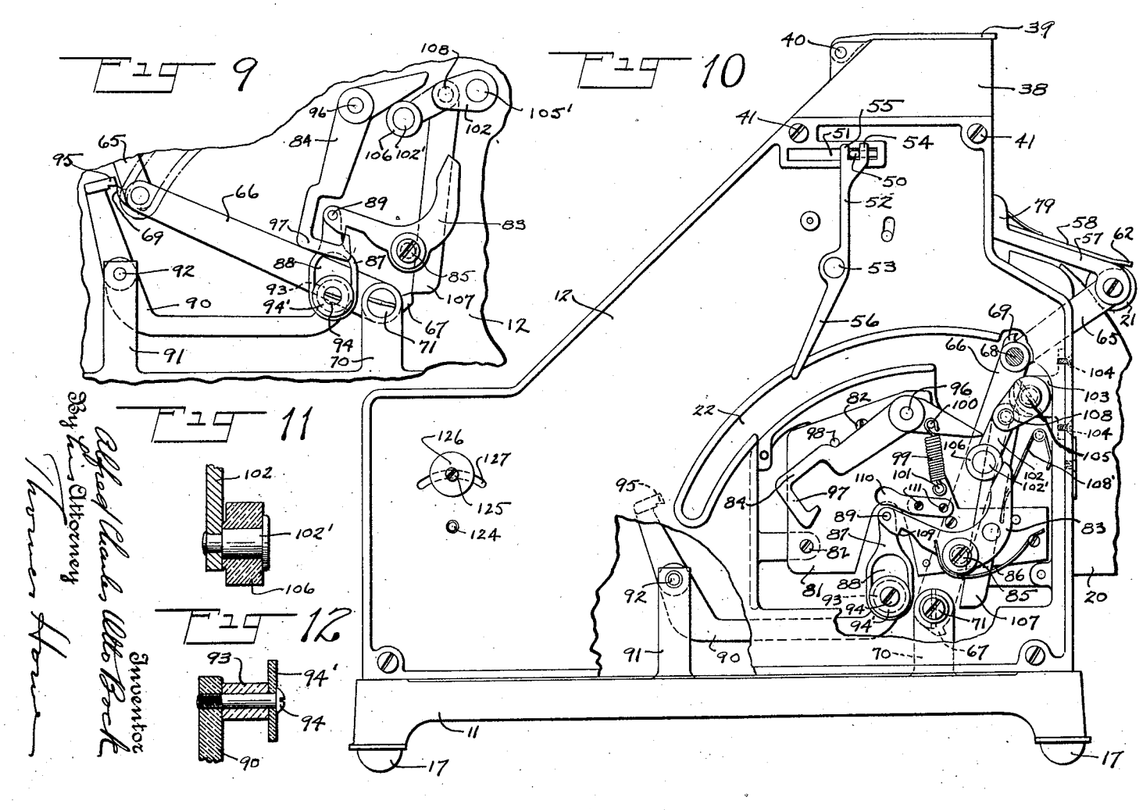
Fig. 9 is a fragmentary view in elevation of a detail of the machine showing the arrangement of the levers.
Fig. 10 shows a side view in elevation, part of the side of the casing being removed to show the arrangement of the levers in normal position.
Fig. 11 is a sectional view of one of the levers with a roller mounted thereon.
Fig. 12 is a cross sectional view of another lever with a roller mounted thereon.
Figure 13:
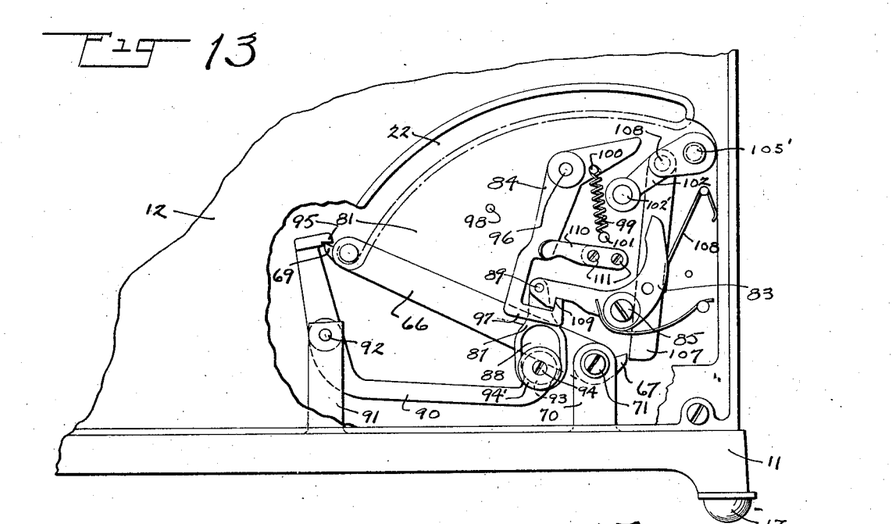
Fig. 13 is a fragment in side elevation of the machine, a part of the casing being broken away showing the levers in locked position.

A support 81 of insulating material is secured to the side of the casing by screws 82 or the like. The plate 23 forms a cover for the support. Pivoted to said support are levers 83 and 84, at points 85 and 96 respectively, the lever 83 being disposed beneath the lever 84 and of angular formation. A flat spring 86 tends to force the lever in a counter clockwise direction as viewed in Fig. 10. Pivoted to one end of this lever at 89 is a link 87 which is provided with an elongated slot 88. Slidably disposed in the slot 88 is the roller 93 rotatably mounted on a bolt 94 in one end of an angular-shaped lever 90, the lever 90 is pivoted to a support 91 at 92. A sectional view of the roller 93 is shown in Fig. 12. The washer 94' serves to prevent withdrawal of the roller from the slot 88.

It will thus be seen that upon the clockwise movement of the lever 83, the lever 90 will be turned in a counter-clockwise direction. Formed on the end of the lever 90 is a hook portion 95, the purpose of which will be pointed out later.

The lever 84, angularly shaped and pivoted to the support 81 at 96, is provided at one end with a hook portion substantially L-shaped as at 97. An abutment 98 limits the movement of the lever 84 in one direction and the coil spring 99 attached to the lever at 100 and to the support 81 at 101 maintains the lever against the abutment 98.

The lever 102 is pivoted to a bracket 103, secured to the end of the casing by screws or the like 104, at 105. A roller 106 is rotatably mounted on the end of the lever 102 at 102' and is adapted to bear against the end of the lever 83 and to move the same in a clockwise direction. The roller 106 is also adapted to bear against the under side of lever 84 when the lever 102 is rotated in a clockwise direction.

The lever 107 pivotally secured at 108 to the lever 102 between its end extends downwardly, and is adapted to be moved by the lever 66 through the medium of the lug or extension 67. A flat spring 108 maintains the lever 107 outwardly and in proximity to the extension 67 so that when the lever 66 is moved in a counter-clockwise direction the extension 67 will bear against the end of the lever 107 moving the same upwardly. The roller 106 is adapted to bear against the under side of the lever 84 which will be moved in a counter-clockwise direction, whereupon the L-shaped end 97 will be locked in the notch 109 of the lever 83.

Secured to the support 81 is a strip of metal 110 fastened thereto by screws or the like 111. On the opposite side of the support 81 are secured at points 114 and 115 two wires 112 and 113, by means of nuts 116 and 117. The wire 113 is adapted to convey an electric current to the metal strip 110, the current passing through the screw 111, while the wire 112 is adapted to convey an electric current to the lever 84 through the pivotal connection 96. It will thus be seen when the lever 84 is brought in contact with the metal strip 110 a circuit will be formed.

Formed integrally on one side of the casing is a curved metal strip 118 provided with a plurality of corrugations 119 over which rod 76 is adapted to ride when the operating handle is moved in a counter-clockwise direction. These corrugations serve to spread the pigment upon the impression surface and to jar therefrom any unnecessary pigment, which will fall into the drawer below it.

Vertically disposed at one end of the casing is a block of insulating material 120. An angular-shaped bracket 121 is secured to said block by bolts 122 and nuts 123. A screw 124 secures the bracket 121 to one side of the casing. A bolt 125 provided with a washer 126 extends through an arcuately-shaped slot 127 formed in the side of the casing, and held against movement by the nut 128. It will thus be seen by loosening the nut 128 the block 120 may be moved forwardly or rearwardly, the screw 124 serving as a pivot.

A plurality of small heater coils 129 are secured to one side of the block 120 being wound about screws 130. The ends of the coil 129 are attached to binding posts 131, which are secured to the block 120 near the base and at each end thereof.

The wire 112 is secured to a binding post 131 at one end, and, as pointed out above, to the pivotal connection 96 at the other end. Wire 113, attached to the metal strip 110 at one end, is attached at its other end to the contact 132 by nuts 133. Contact 132 is mounted in an insulated manner on the casing. A contact 135 likewise mounted in and insulated from the casing provides for a connection of the wire 136, which is attached at its other end to the binding post 131. To the projections 132 and 135 may be attached a source of electric current, the conventional plug (not shown) being slid thereover.

Figures 16, 17:
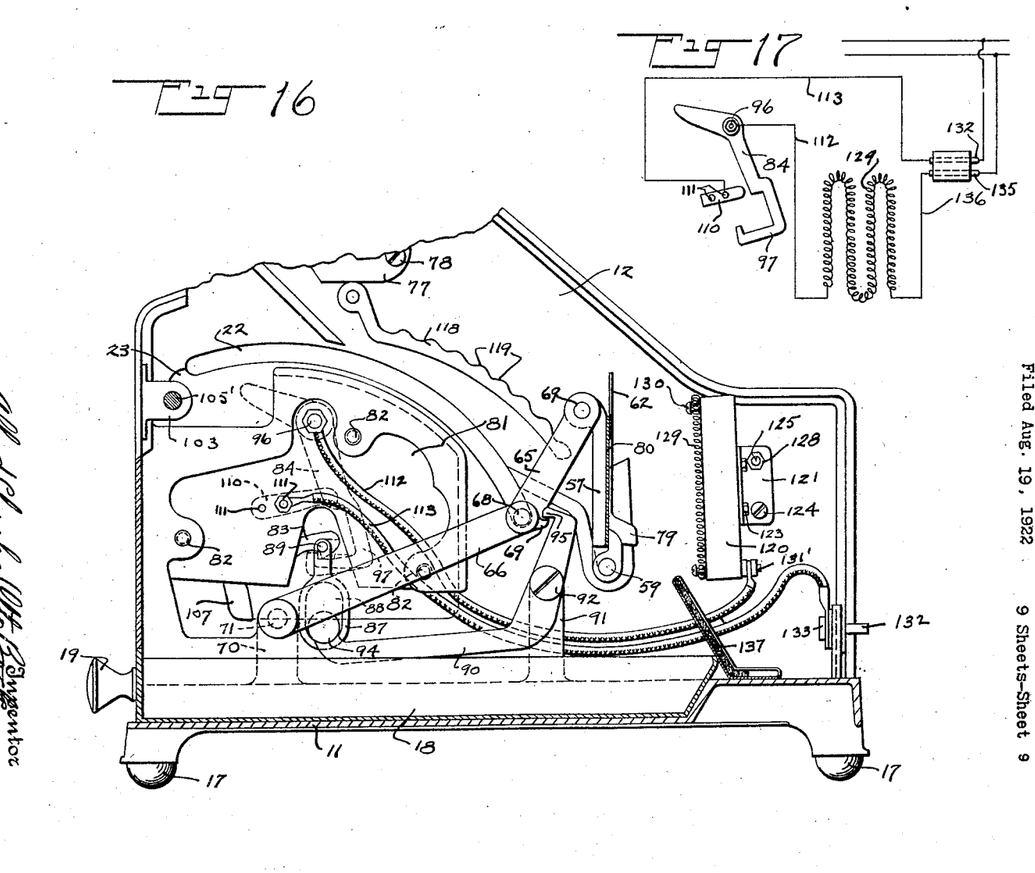
Fig. 16 is a sectional view similar to Fig. 4 partly broken away, showing the impressed surface in heating position.
Fig. 17 is a diagram of the electric connections of the heater coils.

It will be observed from the above description that when the lever 84 is moved into contact with the strip 110 a circuit will be formed through the wire 113 to the strip 110, thence through the lever 84 (which may be of brass or any suitable conductive metal) through the wire 112 and through the series of small coils 129 thereby heating them to a great intensity. From the small coils the current will then flow through the wire 136. The circuit is pointed out in the diagram shown in Figure 16.

An insulation plate 137 is attached to the base of the casing 10 and is inclined forwardly and upwardly in front of the block 120. This plate serves to keep the intense heat from the pigment, which has been jarred from the impression surface, in the drawer.

Mounted on the rod 105′ and adapted to rotate therewith is a gear 132. Adjacent the gear 132 and mounted on the rod 105′ and rotating therewith is the ratchet wheel 139, provided with teeth 140′. A smaller gear 133, adapted to rotate with the rod 133′ is disposed beneath the rod 105′. The gear 132 meshes with the gear 133. Gear 134, larger than the gear 133, is also mounted to rotate with the rod 133′. The rod 140 carries a small gear 135 rotating therewith. The gear 135 meshes with the gear 134. Also mounted upon the rod 140 is a large gear 136, which in turn meshes with the smaller gear 137, which is mounted to rotate with the rod 141. A fan 138 is also mounted upon the rod 141. The rods 141, 140 and 133′ are adapted to rotate in the sides of the gear housing 20.

It will thus be seen by rotation of the rod 105′ due to the step up gearing, the fan 138 may be rapidly rotated even though the rod 105′ is turned slowly. The fan 138 serves in a sense as a governor.

Secured to the rod 105′ is a lever 142 to which is pivotally attached a pawl 143, which is adapted to engage with the ratchet teeth 140′ upon the rotation of the rod 105′ in a counter-clockwise direction.

Secured to one end of the rod 105′ is an upstanding lug 144. A spring 29 is attached to the lug 144 by means of a screw 145; the other end of the spring being adjustably secured to the plate member 27 by a screw 146 as pointed out above.

A spring 147 maintains the lever 66 in an upright position and is attached to a bracket 148 by means of a lug 149; and to the lever by a lug 150.

In the operation of this machine a cardboard, sheet of paper, or other suitable material will be inserted under the retainer 58. A person will then press his finger on the surface, the moisture or excretions from the body making an outline thereon. The operator will then grasp the handle 21, move it in a counter-clockwise direction in the guide way 22. By such movement the lug 79 on the base member 57 will bear against the lug 44 moving the same outwardly thereby discharging pigment from the opening 46 on to the impressed surface.

The pigment is in the form of a powder which may consist of asphaltum 6 parts by volume; wheat flour, 4 parts by volume; talc powder, ¼ part by volume and silicon ⅛ part by volume, although it is to be understood other suitable pigment may be used without departing from the spirit of the invention.

This movement will be retarded by the lug 76 riding over the lever 77 and contacting with the recesses 74 and 75 formed in the lever 72. Thus sufficient time will be given for the pigment to be applied to the impressed surface. Further movement of the operating handle will cause the impressed surface to drop upon the corrugated strip of metal 118 and movement thereover will spread the pigment upon the impressed surface and jar that which is unessential into the drawer 18 below it.

The lever 66 being moved in a counter-clockwise direction will cause the extension or lug 67 to encounter the end of the lever 107 moving it upwardly, thereby moving the lever 102 upwardly. The roller 106 will then be brought against the lever 84 moving it in a counter-clockwise direction until the L-shaped end will register with the recess 109 formed in the lever 83. The strip 110 will by this time be forced into contact with the lever 84.

Thus it will be seen that the lever 84 is locked with the lever 83 and can only be released by the roller 106 bearing against the vertical portion of the lever 83 and moving the same out of engagement.

By further movement of the impressed surface the lug 69 on the lever 66 will catch in the notch 95 of the lever 90, holding the impressed surface against further movement. The impressed surface by this time will be in a vertical position parallel to the coils 129. In view of the fact that the metal strip 110 is in contact with the lever 84 the circuit will be formed as pointed out above, and the wires 129 heated thereupon and the impressed surface being brought into position parallel to the wire, the pigment thereon will be fused into the surface.

It should be noted that after the pigment is applied to this surface on which the impression is made further movement of the impression surface retaining member will bring it into contact with the lever 56, moving it in a clockwise direction and returning the slide 42 by means of a finger 50 on the lever 47 to its former position for the next operation as noted above.

As pointed out above when the lever 107 is forced upwardly by the extension 67 the rod 105′ being turned in a clockwise direction thereby extending the coil spring 29, the pawl 143 will also be turned in a clockwise direction and will catch in the teeth of the ratchet wheel 140′, when the operating handle 21 has reached the limit of movement.

Assuming now that the lug 69 is locked in the extension 95 and the coil spring 29 extended, the coils 129 are now heated due to the circuit being formed and the pigment being fused into the impressed surface. The coil spring 29 is constantly tending to rotate the member 144 in a counterclockwise direction, thus the rod 105′ will be rotated in a counter-clockwise direction and through the series of gears above described the fan 138 will be rotated. Due to the rotation of the rod 105′ the lever 102 will be moved in a counter-clockwise direction against the lever 83, thereby moving the lever 87 upwardly. The lever 87 will move the lever 90 in a counter-clockwise direction, thereby releasing the lug 69 from the extension 95 and permitting the lever 66 to return to its normal position due to the action of the coil spring 147, the impressed surface retaining member riding up over the guide way 119′ against the hooked end portion thereof 120′.

Figures 5, 6:
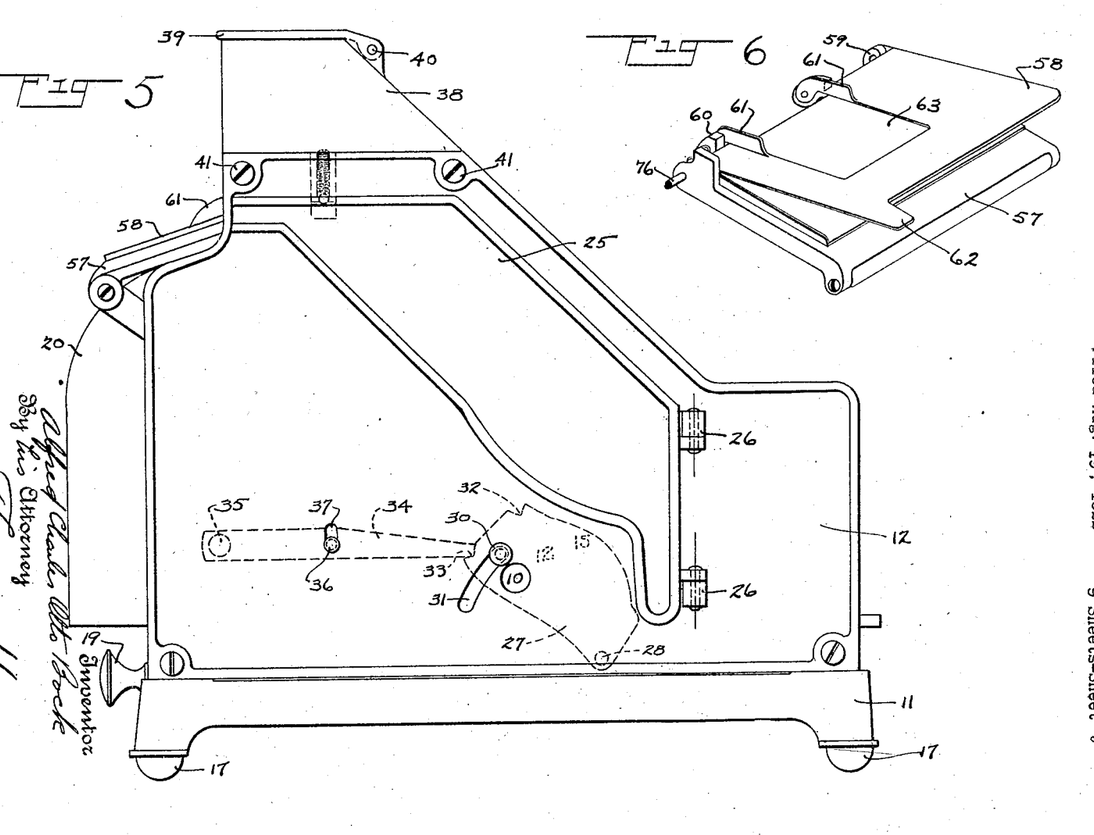
Fig. 5 is a side view in elevation showing the adjusting means for the coil spring.
Fig. 6 is in perspective a detail of the invention showing the impression surface retaining member.
Figure 7:
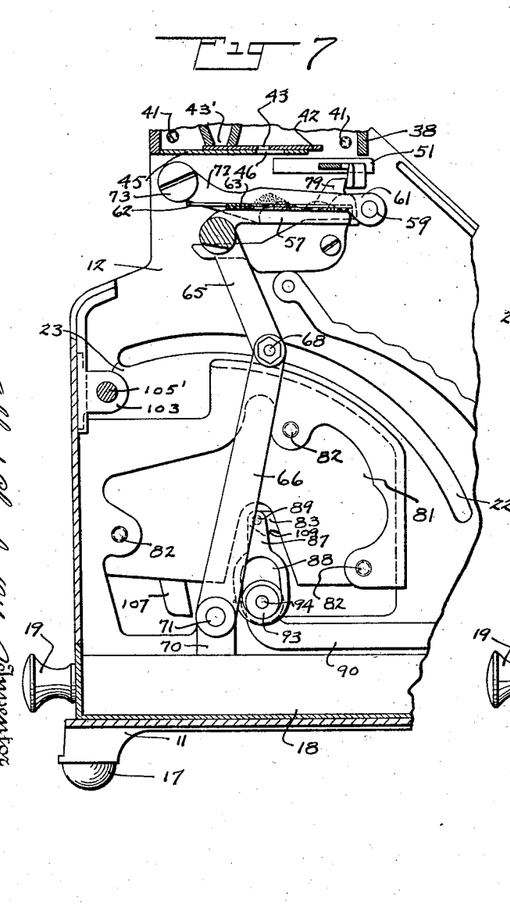
Fig. 7 is a partial cross-sectional view on the line 4—4 of Fig. 2 showing the apparatus in pigment applying position.
Figure 8:
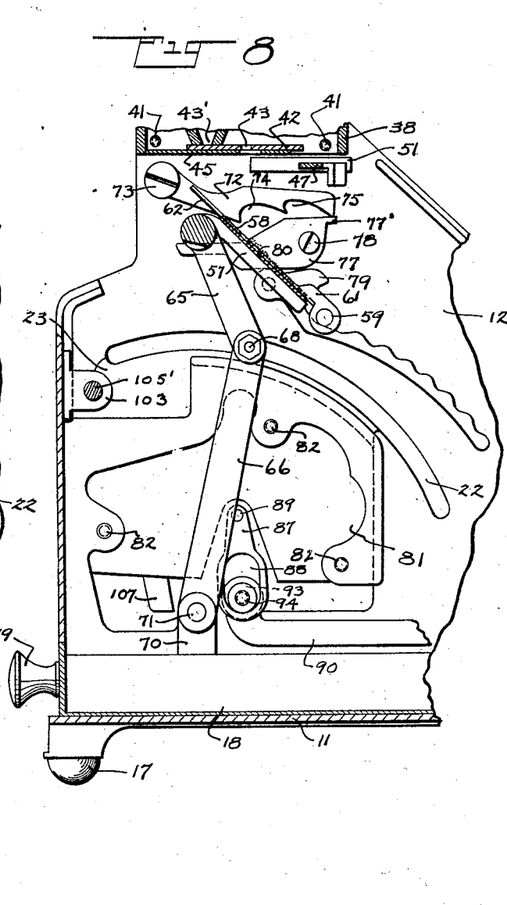
Fig. 8 is a view similar to Fig. 7 showing another position of the impression surface in the operation of the machine.

From the above it will be observed that the impressed surface is held adjacent the heating means for a certain length of time, which may be varied by movement of the knob 30 shown in Figure 5 permitting the impressed surface to be held 10, 12, 15 or any number of seconds desired (the numerals 10, 12 and 15 only being shown by way of illustration). The timing mechanism is composed mainly of a series of gears whose operation is controlled by a coil spring, the tension of which may be varied at will. It is thus seen that the impression surface will not be burned or charred by over-exposure, in view of the fact that after the operator moves the handle to its limit, further operation or care on his part is dispensed with, the handle being returned to normal position by means of a spring.

While the invention has been illustrated in what is considered its best application it may have other embodiments without departing from its spirit and is not, therefore, limited to the structures shown in the drawings.

What I claim is:

1. In a finger print machine in combination, a support for an impression surface, means for moving said surface, pigment supplying means, means for fixing said pigment on the impressed surface, and timed means adapted to hold said impressed surface adjacent said fixing means a predetermined length of time.

2. In a finger print machine in combination, a support for an impression surface, means for moving said surface, pigment supplying means, means for fixing said pigment on the impressed surface, and timed means adapted to hold said impressed surface adjacent said fixing means a predetermined length of time, said timed means being adjustable.

3. In a finger print machine, in combination, a support for an impression surface, pigment applying means, means for moving said surface, means for fixing said pigment onto said surface, and automatic means for returning said surface to normal position after the said pigment is affixed thereto.

4. In a finger print machine, in combination, a support for an impression surface, means for moving said surface, pigment applying means, heating means, and timed means adapted to hold said surface adjacent said heating means a predetermined length of time.

5. In a finger print machine, in combination, a support for an impression surface, means for moving said surface, pigment applying means, heating means, timed means adapted to hold said surface adjacent said heating means a predetermined length of time, said timed means being adjustable.

6. In a finger print machine, in combination, a support for an impression surface, means for moving said surface, pigment applying means, heating means, timed means adapted to hold said surface adjacent said heating means a predetermined length of time, and automatic means for returning said impression surface to normal position.

7. In a finger print machine, in combination, a support for an impression surface, pigment applying means, means for removing superfluous pigment from said surface, means for fixing said pigment onto said surface, and timing means controlling the action of said fixing means.

8. In a finger print machine, in combination a support for an impression surface, pigment applying means, means for fixing said pigment onto said surface, and automatic means controlling the action of said fixing means on said pigment.

9. In a finger print machine, in combination a support for an impression surface, pigment applying means, means for moving said surface, means for spreading said pigment onto said surface, automatic means to return said surface to normal position adapted to be operated after a predetermined length of time.

10. In a finger print machine, in combination a support for an impression surface, means for applying pigment to said surface, means for moving said surface, means for heating pigment on said surface, means for holding said surface adjacent said heating means a predetermined length of time, and automatic means to return said surface to normal position.

11. In a finger print machine, in combination a support for an impression surface, means for applying pigment to said surface, means for fixing pigment to said surface, and timing means for controlling the period said surface is subjected to said fixing means, said timing means comprising a series of gears.

12. In a finger print machine, in combination a support for an impression surface, means for moving said surface pigment supplying means, heating means, timing means and means for returning said surface to normal position.

13. In a finger print machine, in combination a support for an impression surface, pigment applying means, means for fixing said pigment onto said surface, and timing mechanism for controlling the action of said fixing means.

14. In a finger print machine, in combination a support for an impression surface, pigment applying means, means for fixing said pigment onto said surface, timing mechanism for controlling the action of said fixing means and spring means for returning said surface to normal position.

15. In a finger print machine the combination with a movable support for the impressed surface, of means for moving said support, means controlled by the movement of said surface for applying pigment thereto, means for heating a pigment on said surface and timing means comprising a series of gears for controlling the period of exposure of the pigmentized paper to said heating means and means for returning said support to normal position.

16. In a finger print machine the combination with an impressed surface carrier, of means, automatic in part, for moving said carrier, pigment applying means and means for fixing said pigment onto said impressed surface.

17. In a finger print machine, in combination, an impressed surface carrier, pigment applying means, means for moving said carrier, automatic means for returning said carrier to normal position, and means for fixing said pigment onto said impressed surface.

18. In a finger print machine, in combination, an impressed surface carrier, pigment applying means, means for moving said carrier, automatic means for returning said carrier to normal position after a predetermined length of time, and means for fixing said pigment onto said impressed surface.

19. In a finger print machine, the combination of an impressed surface carrier, pigment applying means, means for fixing said pigment on said impressed surface, and motive means moving said carrier in one direction.

20. In a finger print machine, the combination of an impressed surface carrier, pigment applying means, means for fixing said pigment onto said impressed surface, and a spring operated motive means for moving said carrier in one direction.

21. In a finger print machine, the combination with an impressed surface carrier, pigment applying means, means for fixing said pigment onto said impressed surface, and a motive means adapted to move said carrier through a portion of its travel.

22. In a finger print machine, the combination of an impressed surface carrier, pigment applying means, means for fixing said pigment on to said impressed surface, means for manually moving said carrier through a portion of its travel, and motive means for moving said carrier, the remainder of its travel.

23. In a finger print machine, the combination of an impressed surface carrier, pigment applying means, means for fixing said pigment onto said surface, means for manually moving said carrier forwardly, and motive means to return said carrier to normal position.

24. In a finger print machine, the combination of an impressed surface carrier, pigment applying means, means for fixing said pigment onto said surface, means for moving said carrier and motive means adapted to have energy stored therein during a portion of the travel of said carrier and adapted to remove the carrier from the pigment fixing position.

25. In a finger print machine, the combination of an impressed surface carrier, pigment applying means, means for fixing said pigment onto said surface, and motive means controlled by the movement of said carrier.

26. In a finger print machine, the combination of an impressed surface carrier, means for applying pigment to said surface, means tending to hold said carrier in pigment applying position, means for fixing said pigment onto said surface, and a motive means for moving said carrier through a portion of its travel.

27. In a finger print machine, the combination of an impressed surface carrier, means for applying pigment to said surface, a guide for said carrier from pigment applying position to pigment fixing position, a second guide for said carrier from pigment fixing position to normal position, and means for fixing said pigment onto said surface.

28. In a finger print machine, the combination of an impressed surface carrier, a support for said carrier, means for applying pigment to said surface, lever means tending to hold said carrier in pigment applying position, means for fixing pigment onto said surface and spring means for moving said carrier through a portion of its travel.

In testimony whereof I have signed this specification this 28th day of July 1922.

ALFRED CHARLES OTTO BOCK.